Dec. 17, 1935.  E. R. KOONZ  2,024,169
TAP
Filed Dec. 2, 1933
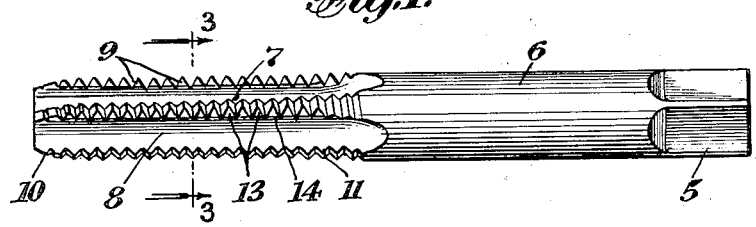
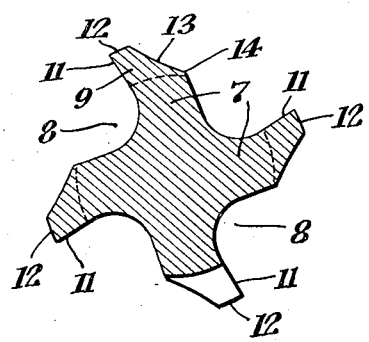
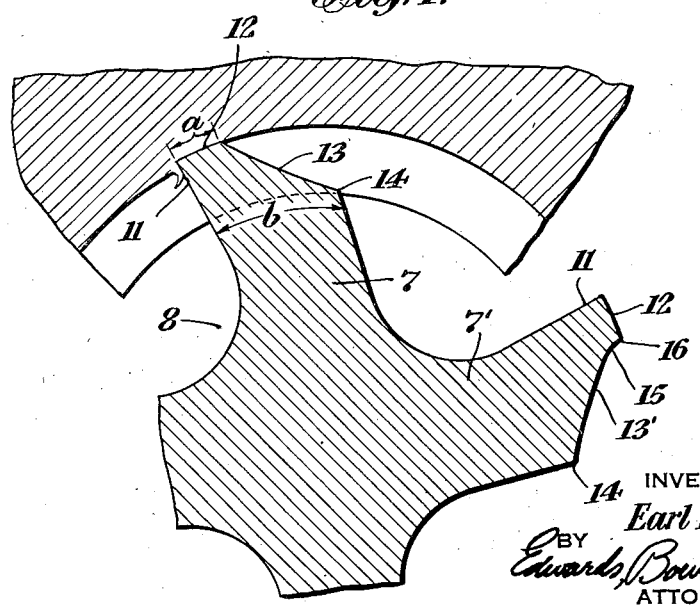
INVENTOR
Earl R. Koonz
BY
Edwards, Bower & Pool
ATTORNEYS Patented Dec. 17, 1935

2,024,169

UNITED STATES PATENT OFFICE 2,024,169

TAP

Earl R. Koonz, Greenfield, Mass., assignor to Greenfield Tap and Die Corporation, Greenfield, Mass., a corporation of Massachusetts Application December 2, 1933, Serial No. 700,645

3 Claims. (Cl. 10—141)

This invention relates to taps and particularly to taps for mild steels such as 1020 S. A. E. Such soft steels tend to load the tap surfaces due to the action of the steel particles adhering in the grooves of the tap. This is very objectionable in shortening the life of the tap and in producing defective threading, and in automatic machines much of the work is likely to be spoiled before the trouble is detected.

The main object of the present invention is to provide a tap which will overcome these objections and eliminate this loading action. Another object of the invention is to provide such a tap which will be simple and inexpensive in manufacture and sturdy and durable in use.

In the accompanying drawing illustrating the invention

Fig. 1 is a plan view of a tap,

Fig. 2 is a perspective view of the entering end of the tap on enlarged scale,

Fig. 3 is a section on enlarged scale taken on line 3—3 of Fig. 1 and looking in the direction of the arrows, and Fig. 4 is a partial transverse sectional view illustrating the action of the tap threads and also illustrating a modified form of teeth on one of the lands.

In the specific embodiment of the invention shown in the drawing the tap has the head 5, shank 6 and four lands 7 separated by the flutes 8. The teeth 9 of the lands form an interrupted helical thread, and the entering end of the tap is tapered as shown at 10. The flutes 8 may be slightly tapered to greater depth and width toward the end 10.

The teeth 9 of V shape have their cutting edges 11 formed with a forward rake as shown and their peripheral apexes 12 substantially cylindrically helical around the axis of the tap. The lengths a of the teeth at the periphery 12 are short about one fourth to one half of the tooth length b measured at the root (Fig. 4) and the backs or heels 13 of the teeth are faced off at an angle along lines extending from the rear edges of the apexes to points 14 outward above the roots of the teeth.

The tap teeth of this invention thus have the lengths of their peripheral portions reduced generally to less than .4 of the root lengths with the intermediate side portions increasing in length from the tip toward the center. The area of the teeth in contact with the metal is thus progressively decreased to less than half at the periphery while at the same time preserving the cylindrical form of the periphery.

I have found that such reduction of the outer contact areas eliminates loading of the tap surfaces by mild steels and the like and that taps so formed are self-clearing both in cutting and reverse. The peripheral cylindrical shape at the apex maintains strength and rigidity of the cutting point and insures uniform gage size in the work, and it is this peripheral contact between the flanks of the tap teeth and the flanks of the thread being formed which prevents chips and small particles from wedging in the threads during reversal of the tap and prevents the objectionable loading action and gives a smooth, accurate finish on the threads being cut. Another advantage of the extra clearance provided by the reduction in the peripheral length of the teeth is the greater room for chips in the flute and the formation of a pocket forcing oil into the friction spaces between the contacting surfaces of the threads upon reversal. The strength at the base of the tap teeth is the full width of the land 7 so that there is no weakening of the structure and rigidity and alinement are maintained. Preferably the heel surfaces 13 will be formed to be concave between the apex and the root so that the heel surface at the apex is more nearly radial to provide a better scraping and cleaning action upon reversal of the tap.

While the invention has been described in connection with a particular tap, it is not confined to the precise structural details shown, and various modifications will be obvious to those skilled in the art. For instance, as shown in the teeth on land 7' of Fig. 4, the heel surfaces 13' may be formed with emphasis of the concavity at the point 15 adjacent the periphery so that the back edge 16 of the apex of the tooth is much more nearly radial in direction. In production the tap of this invention is easily and simply formed by correspondingly shaping the rear surfaces of the lands, or preferably by first forming the tap in usual manner with the fully extended peripheral apexes of the teeth and then cutting away the heel portions of the tap teeth to the desired angle and contour, such as 13 or 13'. For instance, the heel surfaces 13 may be formed by grinding away the rear portions of the teeth by a grinding wheel having its axis approximately parallel to the tap axis and its periphery corresponding to the concavity of the surfaces 13.

The tap of this invention is thus simple and inexpensive in manufacture and durable in use avoiding all tendency to load up in service even with the mild and tough steels. This is particularly important in connection with automatic machines where even the closest inspection will not detect defective work until long after much of the product has been ruined or can only be reclaimed at the expense of costly special repair.

I claim:

1. A thread cutting tap having a series of lands with separating flutes, teeth on said lands having their roots equal in length to the width of the lands and relatively short peripheral apexes circularly concentric with the axis of the tap, and concave heel surfaces cutting away the rear portions of said teeth along lines extending at an angle from the rear ends of said apexes to said roots and leaving tapering clearance spaces between said apexes and said flutes, the lengths of said apexes being less than one half the width of said lands.

2. A thread cutting tap having a series of lands with separating flutes, teeth on said lands having their roots equal in length to the width of the lands and relatively short peripheral apexes circularly concentric with the axis of the tap, and inclined heel surfaces cutting away the rear portions of said teeth along lines extending at an angle from the rear ends of said apexes to said roots and leaving tapering clearance spaces between said apexes and said flutes, said heel surfaces having a sharp concavity adjacent said apexes so as to be more nearly radial in direction at the periphery than at the root.

3. A thread cutting tap having a series of lands with separating flutes, the front faces of said lands being substantially radial and the rear faces approximately parallel to said front faces, a series of identical teeth on the outer portions of said lands having their roots equal in length to the width of the lands and with peripheral apexes cylindrically concentric around the axis of the tap and of relatively short length approximately one fourth the length of the tooth roots, and inclined heel surfaces cutting away the rear portions of said teeth along predetermined identical lines extending at an angle from the rear ends of said apexes to said roots and leaving tapering clearance spaces between said apexes and said roots.

EARL R. KOONZ.